Sept. 8, 1942.  B. ADKINS  2,295,319
POLYPHASE SHUNT COMMUTATOR MOTOR
Filed Jan. 8, 1942
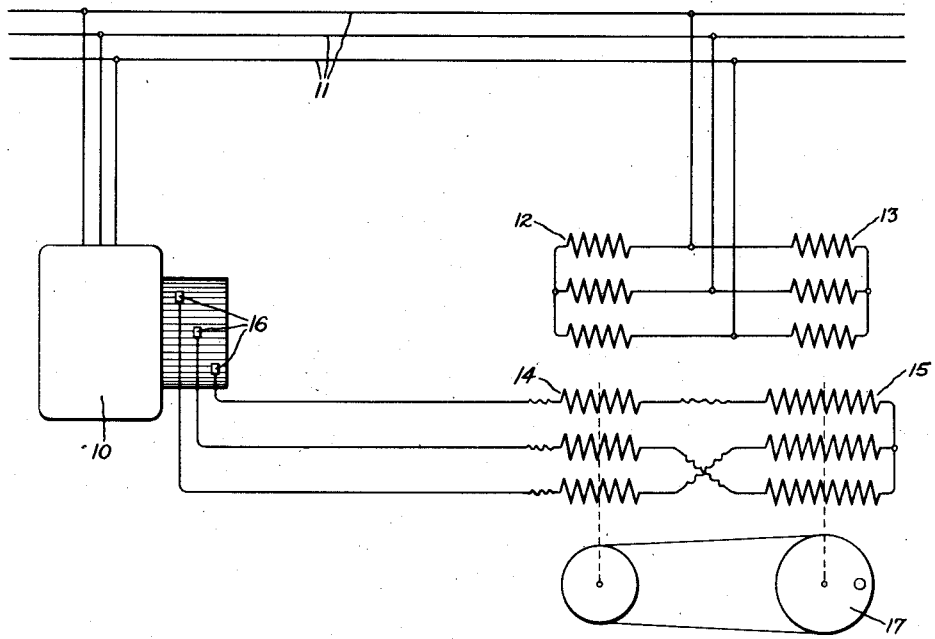
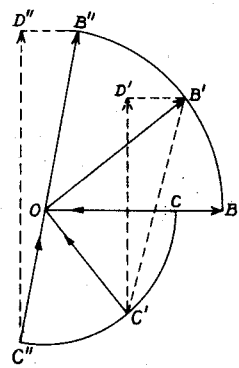
Inventor:
Bernard Adkins,
by Harry E. Dunham
His Attorney.

UNITED STATES PATENT OFFICE 2,295,319

POLYPHASE SHUNT COMMUTATOR MOTOR

Bernard Adkins, Rugby, England, assignor to General Electric Company, a corporation of New York Application January 8, 1942, Serial No. 426,085
In England January 28, 1941

2 Claims. (Cl. 172—280)

My invention relates to improvements in the control of polyphase shunt commutator motors.

The polyphase shunt commutator motor when controlled by a double induction regulator, gives a low power factor compared with an induction motor if the regulator voltage is in phase with the motor secondary voltage, because of the reactance of the induction regulator.

It is the object of the invention to introduce into the secondary circuit a quadrature component of voltage which should be approximately constant over the whole range of the regulator, so as to obtain improved power factor of efficiency, with a simplified construction. This quadrature component is provided, according to the invention, by using two regulators with unequal secondary voltages, and rotating them at unequal rates. The quadrature component at the position of minimum voltage is then equal to the difference between voltages of the two halves, while the quadrature component in the extreme position depends on the difference in angular movement.

The two regulators may be coupled together by means of gears, chains or belts, for example, two worm wheels of unequal size may engage with worms mounted on a common shaft. Alternatively they may be coupled by means of straps, wires or chains attached to disks on the regulator shafts and arranged to give the limited angular movement required.

The features of my invention which are believed to be novel and patentable will be pointed out in the claims appended hereto. For a better understanding of my invention reference is made in the following description to the accompanying drawing, in which Fig. 1 represents a physical embodiment of my invention, and Fig. 2 an explanatory vector diagram pertaining thereto.

In Fig. 1, 10 represents a polyphase shunt commutator motor having its stator energized from a suitable power line 11. I have represented a double induction regulator connected between the power supply 11 and the commutator brushes 16 of the polyphase machine 10 for speed regulation and power factor correction. The primary windings of the regulator are represented at 12 and 13 connected in parallel to the supply lines 11 and I have represented them as similar stationary windings. The secondary adjustable windings of the induction motor are represented at 14 and 15 connected in series to the commutator brushes 16. 17 represents a mechanism for rotating the secondary windings of the induction regulator with respect to the primary windings in the usual manner except that the secondary windings are rotated by unequal amounts. As represented winding 14 will be rotated at a faster rate than winding 15. Also, winding 15 has more turns than winding 14 and hence produces the greater secondary voltage.

In Fig. 2, let OB represent the voltage produced by winding 15 and OC the voltage produced by winding 14 when such voltages are bucking and the resultant is at a minimum value. The differential voltage is equal to CB and is in a direction at right angles to the speed control voltage axis and is, therefore, available for power factor improvement of motor 10.

Now, as the regulator is adjusted to produce a speed control voltage, the vector OB moves through a range OB' to OB'' while vector OC moves through a range OC' to OC''. In the extreme position, vectors OC'' and OB'' add and the speed regulating component is C''D''. In the intermediate position the voltage regulating component is C'D'.

It will be noted that such an arrangement maintains a power factor improving component which is substantially constant through the regulating range and is designated in the three positions as CB, D'B' and D''B'' and this is accomplished with negligible sacrifice of the speed voltage regulating range. For instance, the line C''D'' is very little shorter than the line C''B''.

If winding 14 were rotated at a still faster rate with respect to winding 15 than as represented, the power factor improvement component could be made to increase with the speed regulating component should that be desirable. Likewise, it could be made to decrease with an increase in the speed regulating component. The relative magnitude of the power factor improving component can be changed by changing the relative length of the voltage vectors OC and OB. Thus, if winding 15 be given more turns, OB will increase in length and likewise CB. Thus, the invention involves an unequal secondary voltage and an unequal rate of adjustment of the rotary elements of the two parts of the regulator. But, it is immaterial to the invention whether the primary or secondary windings be made unequal and unequally adjustable.

What I claim as new and desire to secure by Letters Patent of the United States, is:

1. In combination, a polyphase shunt commutator motor, a power supply therefor, a pair of induction regulators connected between said source of supply and the commutator of said motor for regulating the speed of said motor, each of said regulators having relatively rotatable primary and secondary windings, the primary windings being connected to the source of supply and the secondary windings being connected in series to the commutator of said motor, one of said regulators producing a higher secondary voltage than the other, and common means for producing relative rotation between the primary and secondary windings of the regulator with the higher secondary voltage at one rate and between the primary and secondary winding of the other regulator at a relatively greater rate such that a variable speed regulating voltage is delivered to the commutator of said motor, which has a component for power factor correction throughout the range of regulation.

2. In a regulating system, a pair of induction regulators forming a double induction regulator, said regulators having relatively rotatable primary and secondary windings with different transformation ratios and common regulating means for producing relative rotation between the primary and secondary windings of said regulators at unequal rates, the regulator having the higher transformer ratio having the lowest regulating rate.

BERNARD ADKINS.